United States Patent
Rubinstein et al.

(10) Patent No.: US 7,548,681 B2
(45) Date of Patent: Jun. 16, 2009

(54) PREVENTION OF OPTICAL FIBER DARKENING

(75) Inventors: Scott Rubinstein, League City, TX (US); Ramaswamy Meyyappan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/606,645

(22) Filed: Nov. 30, 2006

(65) Prior Publication Data

US 2008/0131063 A1  Jun. 5, 2008

(51) Int. Cl.
  *G02B 6/00* (2006.01)
  *F16M 11/04* (2006.01)
  *E21B 47/00* (2006.01)

(52) U.S. Cl. ............... 385/136; 248/176.3; 166/250.03; 166/250.07

(58) Field of Classification Search ........................ None
  See application file for complete search history.

(56) References Cited

U.S. PATENT DOCUMENTS

| | | | |
|---|---|---|---|
| 4,407,561 A * | 10/1983 | Wysocki | 385/128 |
| 5,485,745 A * | 1/1996 | Rademaker et al. | 73/152.39 |
| 5,495,546 A | 2/1996 | Bottoms, Jr. et al. | |
| 5,825,957 A | 10/1998 | Song | |
| 6,052,502 A | 4/2000 | Coleman | |
| 6,874,738 B2 * | 4/2005 | Ishizaki et al. | 248/176.3 |
| 2003/0094281 A1 * | 5/2003 | Tubel | 166/250.03 |
| 2003/0173079 A1 * | 9/2003 | Chikin | 166/250.07 |
| 2004/0219831 A1 * | 11/2004 | Hall et al. | 439/578 |
| 2005/0051757 A1 | 3/2005 | Shepodd et al. | |

FOREIGN PATENT DOCUMENTS

| | | |
|---|---|---|
| GB | 2145536 | 3/1985 |
| GB | 2382365 A | 5/2003 |
| GB | 2440061 | 1/2008 |
| JP | 3145014 | 6/1991 |
| JP | 11095073 | 4/1999 |
| JP | 2003215412 | 7/2003 |
| WO | 96/41066 | 12/1996 |
| WO | 02095473 A1 | 11/2002 |
| WO | 2004/066000 | 8/2004 |
| WO | 2005103437 A1 | 11/2005 |
| WO | WO 2006/059158 * | 6/2006 |

* cited by examiner

*Primary Examiner*—Tina M Wong
(74) *Attorney, Agent, or Firm*—James L. Kurka; Daryl R. Wright; Robert VanSomeren

(57) ABSTRACT

A technique enables the reduction or prevention of galvanic action by electrically insulating components of a system. Fiber optic systems can be protected with the technique by preventing the formation of hydrogen ions through galvanic action that otherwise contribute to hydrogen darkening of optical fibers.

24 Claims, 3 Drawing Sheets

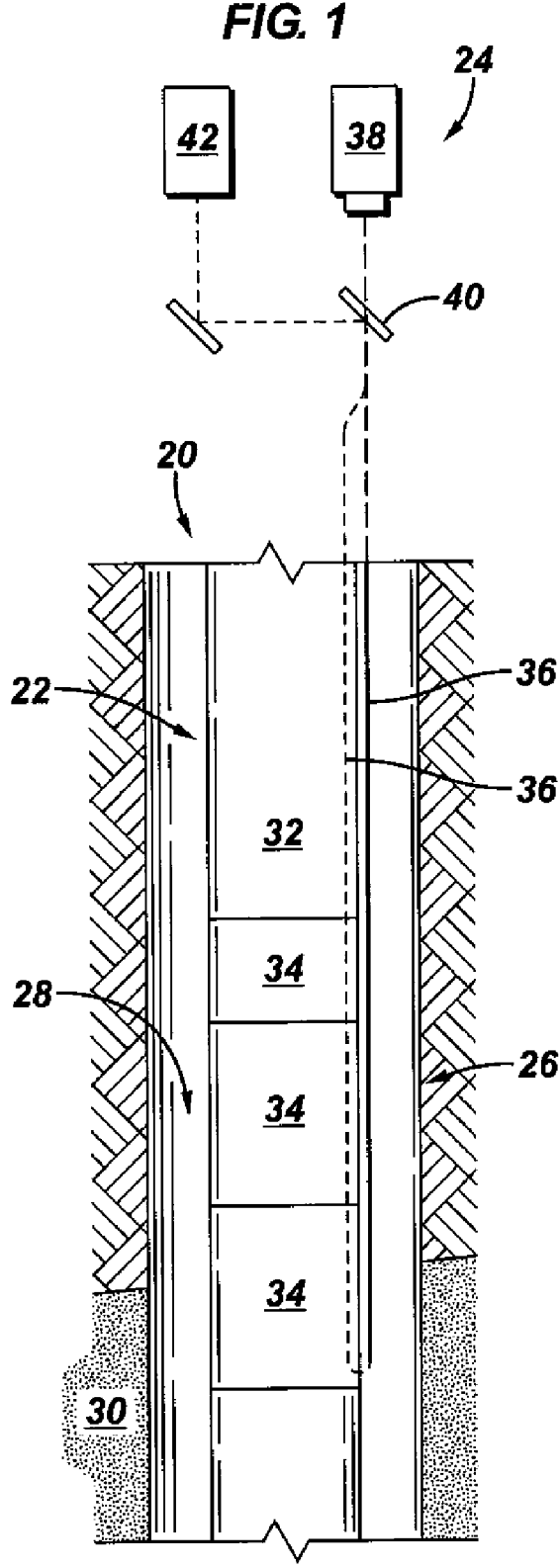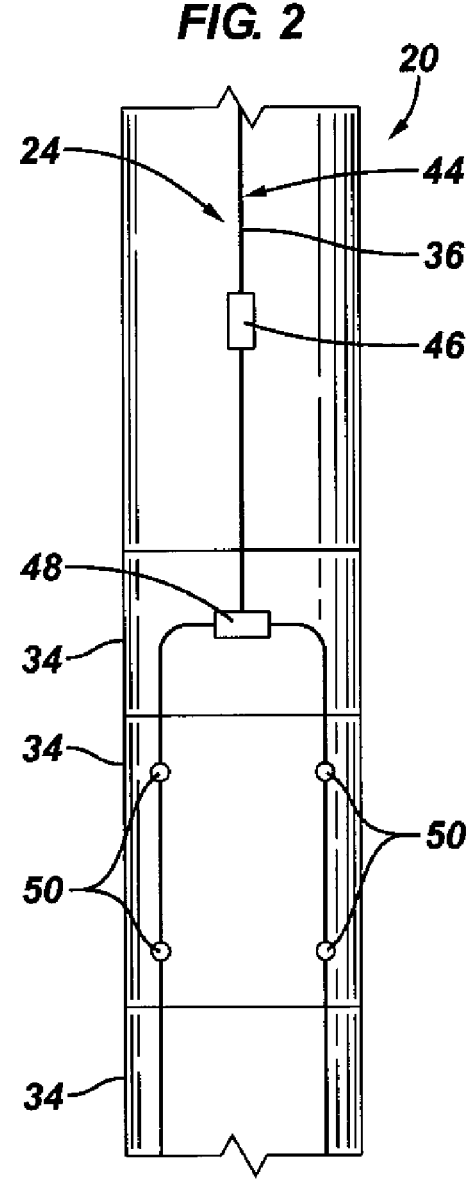

PREVENTION OF OPTICAL FIBER DARKENING

BACKGROUND

The operation of many types of devices and systems is affected when exposed to particular environments. In oil well applications, for example, well components and systems can be subjected to damage or other undesirable effects when exposed to damaging environments, such as exposure to hydrogen ions. Hydrogen ions can be especially damaging to the performance of fiber optic systems, because hydrogen in an ionic form is able to rapidly migrate into the system leading to hydrogen darkening of optical fibers.

Hydrogen ions are generated when a galvanic circuit develops between two metals in electrical contact. The galvanic circuit results in a transfer of ions causing one metal component to act as an anode and experience corrosion. The adjacent, contacting metal component acts as a cathode. The result of the galvanic action is that hydrogen ions are formed at the cathode. The hydrogen ion concentration that develops creates a gradient across the cathode which enables diffusion of the hydrogen ions into the metal components. The migrating hydrogen can reach susceptible components, e.g. optical fibers, and eventually cause hydrogen darkening or other damage to the susceptible components.

SUMMARY

In general, the present invention provides a technique for reducing or preventing optical fiber darkening by galvanic action through the electrical insulation of the anodic and cathodic components of the system. In one embodiment, a fiber optic system is protected by preventing the formation of hydrogen ions in an oil well related environment.

BRIEF DESCRIPTION OF THE DRAWINGS

Certain embodiments of the invention will hereafter be described with reference to the accompanying drawings, wherein like reference numerals denote like elements, and:

FIG. 1 is a front elevation view of a well string installed in a wellbore with a fiber optic system, according to an embodiment of the present invention;

FIG. 2 is a schematic illustration of one example of a fiber optic system, according to an embodiment of the present invention;

DETAILED DESCRIPTION

Figure 3:
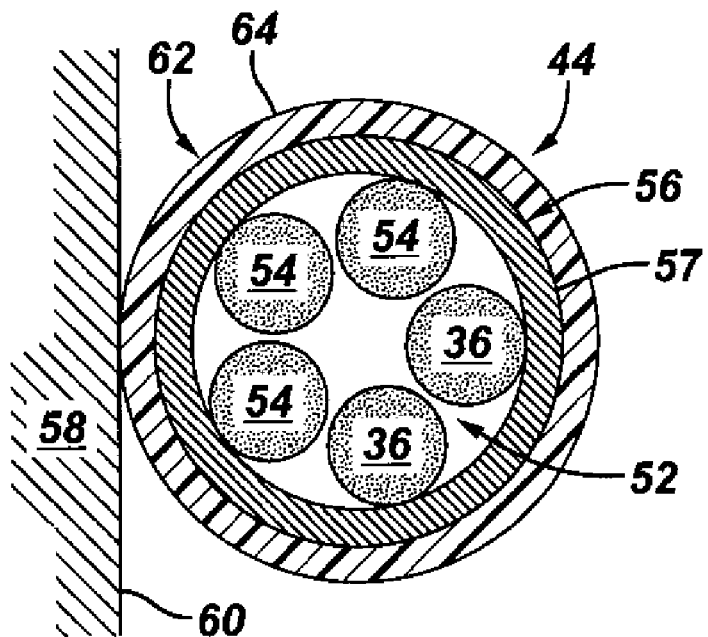
FIG. 3 is a cross-sectional view of a fiber optic cable protected from forming a galvanic circuit by a spacer, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for reducing or preventing fiber darkening due to galvanic action by electrically insulating a fiber optic system or specific components of the fiber optic system from contact with other system components having a different galvanic potential. The technique utilizes spacers to interrupt or prevent establishment of galvanic circuits by keeping conductive, e.g. metallic, components of the fiber optic system from coming into contact with other conductive, e.g. metallic, components within the fiber optic system or the overall well completion. By preventing the formation of galvanic circuits, hydrogen ion generation also is prevented. Without hydrogen generation, susceptible fiber optic system components, such as optical fibers, are protected from migrating hydrogen which otherwise could lead to damage, e.g. hydrogen darkening, of the optical fibers or other components of the fiber optic system.

The present technique is amenable to use in a variety of environments, including well environments. In well environments, fiber optic systems can be deployed to perform a variety of sensing and measurement functions as well as data transmission functions. Fiber optic systems often comprise many different components, at least some of which have conductive, e.g. metal, features. Without use of the present technique, the conductive features can contact corresponding conductive features of adjacent fiber optic system components or other adjacent well equipment components. Accordingly, spacers are positioned along at least the metal features of the fiber optic system to electrically insulate the fiber optic system and its components from contact with electrically conductive features of adjacent components. The release of hydrogen ions is thus prevented, and the functionality of the fiber optic system is protected.

Referring generally to FIG. 1, a system 20 is illustrated according to an embodiment of the present invention. In the particular embodiment illustrated, system 20 comprises a well assembly 22 and a fiber optic system 24 deployed in a well 26 having a wellbore 28 drilled into a formation 30. Formation 30 may hold desirable production fluids, such as oil. Well assembly 22 extends downwardly into wellbore 28 from a surface location, such as the surface of the earth or a seabed floor.

In the embodiment illustrated in FIG. 1, well assembly 22 comprises a tubing or other deployment system 32. Deployment system 32 may comprise, for example, coiled tubing, production tubing, cable or other suitable deployment systems. The deployment system 32 is coupled to one or more well equipment components 34. The number and type of well equipment components utilized varies depending on the well application for which system 20 is designed. Examples of well applications comprise well servicing applications and well production applications.

Fiber optic system 24 can be utilized with well assembly 22 or with other equipment to, for example, sense, measure and/or transfer data related to specific parameters. Fiber optic system 24 comprises one or more optical fibers 36 deployed within well assembly 22 or external to well assembly 22, as illustrated. The fiber optic lines 36 can be connected to sensors and other fiber optic system components to transfer data uphole and/or downhole. However, optical fibers 36 also can be used to perform sensor functions on their own. For example, the optical fibers 36 can be used as distributed temperature sensors or other types of distributed sensors. If distributed sensing is performed, a laser 38 is used to send pulses of laser light through a directional optical coupler 40 and down an optical fiber 36. The light pulses are scattered, and a portion of the scattered light stays within the optical fiber and is guided back toward the laser light source 38. This portion of scattered light is split by directional coupler 40 and directed to a receiver/analyzer 42 for analysis, as known to those of ordinary skill in the art.

As illustrated in FIG. 2, fiber optic system 24 may comprise a variety of fiber optic system components, and the number and type of components can vary substantially from one application to another. Fiber optic system 24 may comprise, for example, a fiber optic cable 44 containing one or more optical fibers 36. In one embodiment, fiber optic cable 44 is a metal jacketed fiber optic cable. Other possible components comprise one or more fiber optic connectors 46, one or more fiber optic splitters 48, and sensors or other measurement and monitoring devices 50. Various other components utilizing optical fiber also can be connected into fiber optic system 24. Many of the fiber optic system components as well as the well equipment components 34 comprise conductive features often in the form of metallic features. Accordingly, a spacer or spacers are used between conductive features of connected and/or adjacent components to interrupt, i.e. prevent or limit, the formation of galvanic circuits. The spacer or spacers can be positioned to separate, for example, metallic features of adjacent fiber optic system components or between a fiber optic system component and an adjacent well equipment component. Depending on the placement, design and orientation of the various components, different types of spacers can be utilized to interrupt potential galvanic circuits.

Referring generally to FIG. 3, for example, one embodiment of fiber optic cable 44 is illustrated as having a plurality of communication lines 52 including one or more optical fibers 36 and other types of communication lines 54, such as electrical lines. The communication lines 52 are jacketed by a conductive feature 56, such as a metal jacket 57. When fiber optic cable 44 is adjacent another component 58 having a metal or otherwise conductive feature 60, the potential for establishing a galvanic circuit is created. However, a spacer 62 is positioned between metal jacket 57 and conductive feature 60 of component 58. By way of example, component 58 may comprise one of the well equipment components 34 or one of the fiber optic system components described with reference to FIG. 2.

In the embodiment illustrated in FIG. 3, spacer 62 comprises an insulating layer 64 placed over metal jacket 57 to separate metal jacket 57 from conductive feature 60. The spacer 62 is of sufficient size to substantially limit or prevent the formation of a galvanic circuit and the resulting galvanic action that can produce hydrogen ions able to damage, for example, optical fibers 36. Spacer 62 is formed from a material having sufficient insulating properties to interrupt formation of such a galvanic circuit. Examples of suitable insulating materials comprise polyetheretherketone (PEEK) materials, polytetrafluoroethylene (PTFE) materials, and fluoronated ethylene propylene (FEP) materials. In some embodiments, the construction of fiber optic cable 44 can utilize a non-metallic spacer positioned along its outer surface beneath the usual plastic encapsulation. Additionally, spacer 62 can be constructed in a variety of forms, as further explain below, to establish adequate separation between metal jacket 57 and feature 60.

Figure 4:
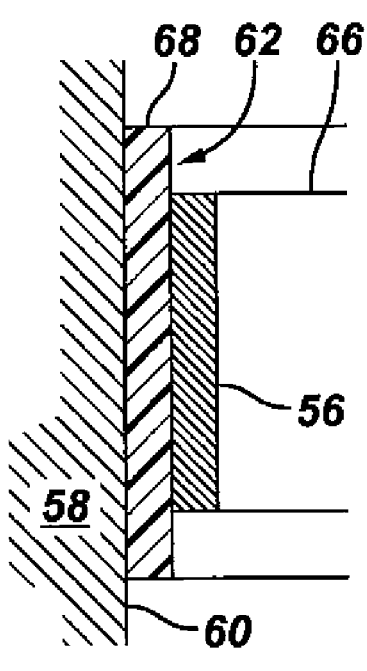
FIG. 4 is a partial cross-sectional view of a fiber optic system component having a conductive feature separated from a conductive feature of an adjacent component by a spacer, according to an embodiment of the present invention.

Another embodiment of spacer 62 is illustrated in FIG. 4. In this embodiment, spacer 62 is positioned between a fiber optic system component 66 and component 58. Fiber optic system component 66 comprises a conductive, e.g. metal, feature 56 and may be in the form of a variety of fiber optic system components, including fiber optic cable, fiber optic connectors, fiber optic splitters, fiber optic system sensors, or other fiber optic system components. Again, spacer 62 is of sufficient size to adequately separate features 56 and 60 to limit or prevent formation of a galvanic circuit. In this embodiment, spacer 62 comprises a sleeve 68 that fits over fiber optic system component 66. Sleeve 68 may be formed from suitable insulating materials, including PEEK, PTFE, and FEP materials.

Figure 5:
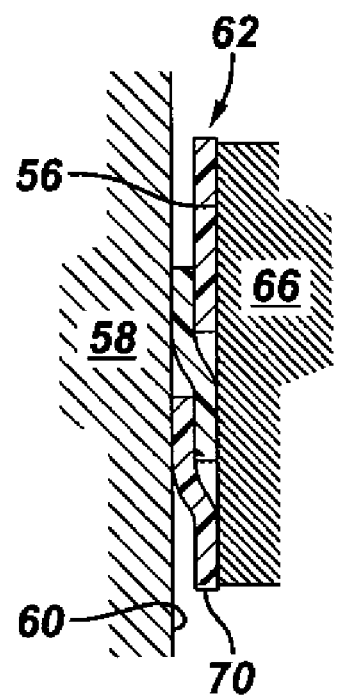
FIG. 5 is a partial cross-sectional view of a fiber optic system component having a conductive feature separated from a conductive feature of an adjacent component by an alternative spacer, according to an embodiment of the present invention.

In another embodiment, spacer 62 comprises a tape 70, such as a polyimide tape or other suitable insulating tape. As illustrated in FIG. 5, tape 70 is wrapped around fiber optic system component 66 to create the spacer 62 with sufficient size, e.g. thickness, to adequately separate features 56 and 60. In one embodiment, tape 70 can be wrapped around metal jacket 57 of fiber optic cable 44. Thus, the formation of a galvanic circuit is interrupted and the potential for hydrogen ion formation is removed.

Figure 6:
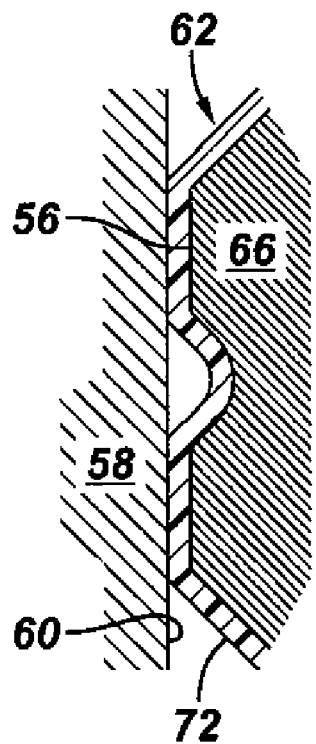
FIG. 6 is a partial cross-sectional view of a fiber optic system component having a conductive feature separated from a conductive feature of an adjacent component by an alternative spacer, according to an embodiment of the present invention.

Referring generally to FIG. 6, another embodiment of spacer 62 comprises a heat shrink material 72. Heat shrink material 72 is an insulating material that shrinks over or along fiber optic system component 66 when heated. Constructing spacer 62 with heat shrink material is particularly useful in insulating fiber optic system components 66 that have complex contours. Again, the heat shrink spacer 62 has a sufficient size to limit or prevent creation of a galvanic circuit by adequately separating features 56 and 60 of the adjacent fiber optic system components or adjacent fiber optic system and well equipment components. The heat shrink member 72 may be formed from suitable insulating materials, including PEEK, PTFE, and FEP materials.

Figure 7:
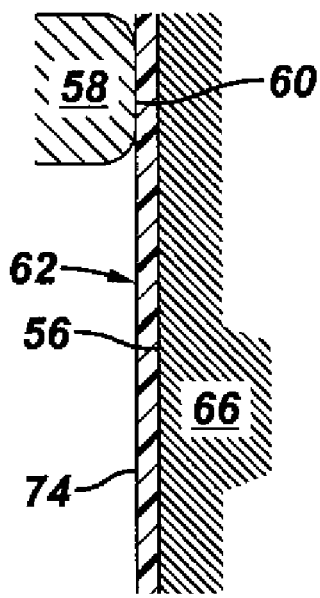
FIG. 7 is a partial cross-sectional view of a fiber optic system component having a conductive feature separated from a conductive feature of an adjacent component by an alternative spacer, according to an embodiment of the present invention.

A further embodiment of spacer 62 is illustrated in FIG. 7. In this embodiment, spacer 62 is constructed in the form of a coating 74 applied to component 58 or component 66. In the embodiment illustrated, coating 74 is applied to fiber optic system component 66 to separate the conductive features 56 and 60 of components 66 and 58, respectively. With this embodiment, spacer 62 also must have sufficient size, i.e. coating 74 must have sufficient thickness, to limit or prevent creation of a galvanic circuit between conductive features 56 and 60. Coating 74 may be formed from appropriate insulating materials, including PEEK materials, PTFE materials, FEP materials, ceramic materials, insulated paint materials, thin-film materials, Sol-Gel™ materials, and certain sprayed on coatings, such as certain insulative HVOF (High Velocity Oxygen Fuel Spray) applied coatings.

Figure 8:
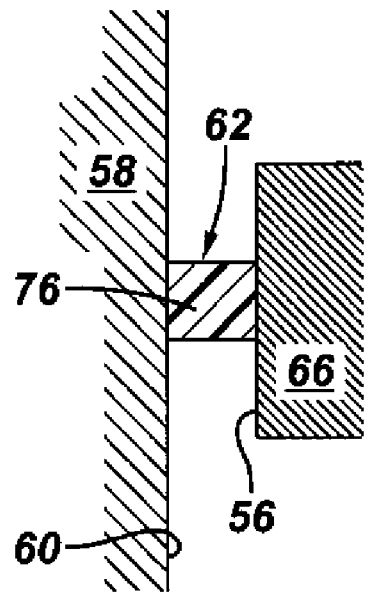
FIG. 8 is a partial cross-sectional view of a fiber optic system component having a conductive feature separated from a conductive feature of an adjacent component by an alternative spacer, according to an embodiment of the present invention.

As illustrated in FIG. 8, spacer 62 also may comprise a standoff 76 positioned to provide sufficient spacing between conductive features, e.g. metallic features, 56 and 60. In many applications, standoffs 76 can be positioned between components or attached to one of the components 58, 66 to prevent, for example, direct metal-to-metal contact. This type of spacer 62, again, limits or prevents the creation of a galvanic circuit and the resulting creation of hydrogen ions that can damage fiber optic system components. Depending on the specific application, the material, design and orientation of the standoff or standoffs 76 can vary. By way of example, standoff 76 may be constructed from PEEK, PTFE, and FEP materials. Further examples comprise PEEK rings, non-metallic members sandwiched between metallic components, over-wrapped spiral sleeves and other standoff configurations.

The spacers described herein can be used in well environments or other environments conducive to the creation of hydrogen ions or other damaging substances due to circuit formation between materials having different electric potentials. Additionally, the spacers can be incorporated into a wide variety of optical fiber system designs used in conjunction with many types of well equipment or other types of equipment.

Accordingly, although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method of protecting components in a downhole environment, comprising:
    forming a fiber optic system with a fiber optic cable having a metal jacket surrounding a plurality of communication lines comprising at least one optical fiber communication line;
    positioning the fiber optic cable adjacent a metal feature of a downhole component; and
    preventing metal-to-metal contact by providing a spacer between the metal jacket and the metal feature, the spacer being of sufficient size to block the generation of hydrogen ions resulting from a galvanic circuit.

2. The method as recited in claim 1, further comprising deploying the fiber optic system within a wellbore.

3. The method as recited in claim 1, wherein preventing metal-to-metal contact comprises providing the spacer in the form of a sleeve.

4. The method as recited in claim 1, wherein preventing metal-to-metal contact comprises providing the spacer in the form of a tape wrapped about the jacket.

5. The method as recited in claim 1, wherein preventing metal-to-metal contact comprises providing the spacer in the form of a heat shrink material.

6. The method as recited in claim 1, wherein preventing metal-to-metal contact comprises providing the spacer in the form of a coating.

7. The method as recited in claim 1, wherein preventing metal-to-metal contact comprises providing the spacer in the form of a standoff.

8. A method of preventing galvanic action in a wellbore, comprising:
    deploying a fiber optic system in the wellbore, the fiber-optic system having at least one optical component with a metallic feature;
    providing a spacer between the metallic feature and a metallic object in the wellbore; and
    forming the spacer of sufficient size to prevent formation of a galvanic circuit between the metallic feature and the metallic object.

9. The method as recited in claim 8, wherein deploying comprises deploying a fiber optic cable having a metal jacket.

10. The method as recited in claim 8, further comprising operating the fiber optic system in the wellbore.

11. The method as recited in claim 8, wherein providing comprises providing a sleeve over the metallic feature.

12. The method as recited in claim 8, wherein providing comprises providing a tape over the metallic feature.

13. The method as recited in claim 8, wherein providing comprises providing a heat shrink material over the metallic feature.

14. The method as recited in claim 8, wherein providing comprises providing a coating over the metallic feature.

15. The method as recited in claim 8, wherein providing comprises providing a standoff attached to the optical component.

16. A system for use in a well, comprising:
    a fiber optic system having an optical component with a conductive feature; and
    a spacer positioned adjacent the conductive feature at a location that otherwise would incur contact between the conductive feature and another conductive well component in the well, the spacer comprising a material that prevents generation of hydrogen ions resulting from a circuit between the conductive feature and the conductive component.

17. The system as recited in claim 16, wherein the spacer comprises a sleeve.

18. The system as recited in claim 16, wherein the spacer comprises a tape.

19. The system as recited in claim 16, wherein the spacer comprises a heat shrink material.

20. The system as recited in claim 16, wherein the spacer comprises a coating.

21. The system as recited in claim 16, wherein the spacer comprises a standoff.

22. The system as recited in claim 16, wherein the fiber optic system comprises a fiber optic cable having a metallic jacket.

23. The system as recited in claim 16, wherein the spacer comprises a polyetheretherketone material.

24. A method, comprising:
    assembling a fiber optic system;
    deploying the fiber optic system along a well assembly in a wellbore;
    blocking generation of hydrogen ions resulting from a galvanic circuit by placing a spacer between a conductive feature of the fiber optic system and a conductive component of the well assembly.

* * * * *